US011233651B2

(12) United States Patent
Stolbikov et al.

(10) Patent No.: US 11,233,651 B2
(45) Date of Patent: Jan. 25, 2022

(54) PASSWORD PROTECTION USING CHAIN OF RANDOM HASHING FUNCTIONS

(71) Applicant: Lenovo (Singapore) Pte. Ltd., Singapore (SG)

(72) Inventors: Igor Stolbikov, Apex, NC (US); Veronika Stolbikova, Cary, NC (US); Rod D. Waltermann, Rougemont, NC (US); Joseph M. Pennisi, Apex, NC (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 66 days.

(21) Appl. No.: 16/821,558

(22) Filed: Mar. 17, 2020

(65) Prior Publication Data
US 2021/0297256 A1 Sep. 23, 2021

(51) Int. Cl.
*H04L 9/32* (2006.01)
(52) U.S. Cl.
CPC .......... *H04L 9/3226* (2013.01); *H04L 9/3242* (2013.01)
(58) Field of Classification Search
CPC ............................ H04L 9/3226; H04L 9/3242
See application file for complete search history.

(56) References Cited

U.S. PATENT DOCUMENTS

| 9,491,164 | B1* | 11/2016 | Fay | G06F 21/46 |
| 2013/0179692 | A1* | 7/2013 | Tolba | H04L 63/0838 |
| | | | | 713/179 |
| 2014/0082367 | A1* | 3/2014 | Lambert | H04W 12/068 |
| | | | | 713/183 |
| 2014/0250517 | A1* | 9/2014 | Kim | G06K 9/00617 |
| | | | | 726/7 |

OTHER PUBLICATIONS

Biryukov et al., "Egalitarian computing," Proceedings of the 25th USENIX Security Symposium, Aug. 10-12, 2016, Austin, TX, 10 pages.
Shamir, "How to Share a Secret," Commun. ACM, vol. 22, No. 11, 1979, pp. 612-613.
Tassa, "Hierarchical Threshold Secret Sharing," Theory of Cryptography Conference, TCC 2004, LNCS 2951, Dec. 2004, Nuremberg, Germany, 27 pages.
Traverso et al., "Dynamic and Verifiable Hierarchical Secret Sharing," Journal of Cryptology, vol. 20, No. 2, 2007, pp. 237-264.

(Continued)

*Primary Examiner* — Nelson S. Giddins
(74) *Attorney, Agent, or Firm* — Van Leeuwen & Van Leeuwen; Jason A. Friday

(57) ABSTRACT

An approach is provided that uses multiple hashing algorithms to verify a password. The approach receives a password that corresponds to a user identifier. A set of hashing algorithms are retrieved with the retrieved set based on the received user identifier so that different user identifiers utilize different sets of hashing algorithms. Hashing the password using each of the hashing algorithms included in the set of algorithms with the hashing resulting in a hash result. An expected hash result that corresponds to the user identifier is retrieved and the approach then verifies the received password by comparing the hash result to the first expected hash result.

17 Claims, 7 Drawing Sheets

(56) References Cited

OTHER PUBLICATIONS

Coelho, "An (Almost) Constant-Effort Solution-Verification Proof-of-Work Protocol based on Merkle Trees," 1st International conference on Progress in Cryptology in Africa, Jun. 2008, Casablanca,, Morocco, pp. 1-8.
Dang, '"'Recommendation for Applications Using Approved Hash Algorithms," NIST Special Publication 800-107, Revision 1, National Institute of Standards and Technology (NIST), Aug. 2012, 25 pages.
Stolbikov et al., "Password Protection Based on Merkle Tree Proofs," U.S. Appl. No. 16/821,592, filed Mar. 17, 2020, 35 pages.

\* cited by examiner

PASSWORD PROTECTION USING CHAIN OF RANDOM HASHING FUNCTIONS

BACKGROUND

Many traditional systems store hash values of user passwords rather than the actual user passwords with a one-way hashing algorithm used to convert the actual user password to the hash representation, or value. Because of the one-way nature of these algorithms, the hash representations cannot be transformed back to the actual password algorithmically. However, a "brute force" attack can be utilized to discover the actual passwords given the hash representations by repeatedly running different character combinations (possible passwords) through known hashing algorithms to attempt to find matches. A valid password is discovered by the attacker when a possible password (combination of characters, symbols, and numbers) is processed by the hashing algorithm that is used by the website or organization and the result is a hash value that matches the hash representation.

Traditional methods of password protection use adaptive one-way hashing algorithms that have a configurable 'work factor,' with the work factor being factors such as time, space, and parallelism, that are imposed on the attacker. Unfortunately, a majority of these work factors can be successfully defeated by determined attackers using specialized hardware, such as application-specific integrated circuits (ASICs) that are specifically designed to run one or more hashing algorithms. Specialized hardware approaches allow fast processing of large numbers of possible password combinations to discover a password that matches a hash value. When the attacker gains access to large numbers of hash representations, such as during a data breach of an organization, discovering a password corresponding to at least one of the accounts to gain entry to a site becomes even easier.

SUMMARY

An approach is provided that uses multiple hashing algorithms to verify a password. The approach receives a password that corresponds to a user identifier. A set of hashing algorithms are retrieved with the retrieved set based on the received user identifier so that different user identifiers utilize different sets of hashing algorithms. Hashing the password using each of the hashing algorithms included in the set of algorithms with the hashing resulting in a hash result. An expected hash result that corresponds to the user identifier is retrieved and the approach then verifies the received password by comparing the hash result to the first expected hash result.

The foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages will become apparent in the non-limiting detailed description set forth below.

BRIEF DESCRIPTION OF THE DRAWINGS

This disclosure may be better understood by referencing the accompanying drawings, wherein.

DETAILED DESCRIPTION

Figure 1:
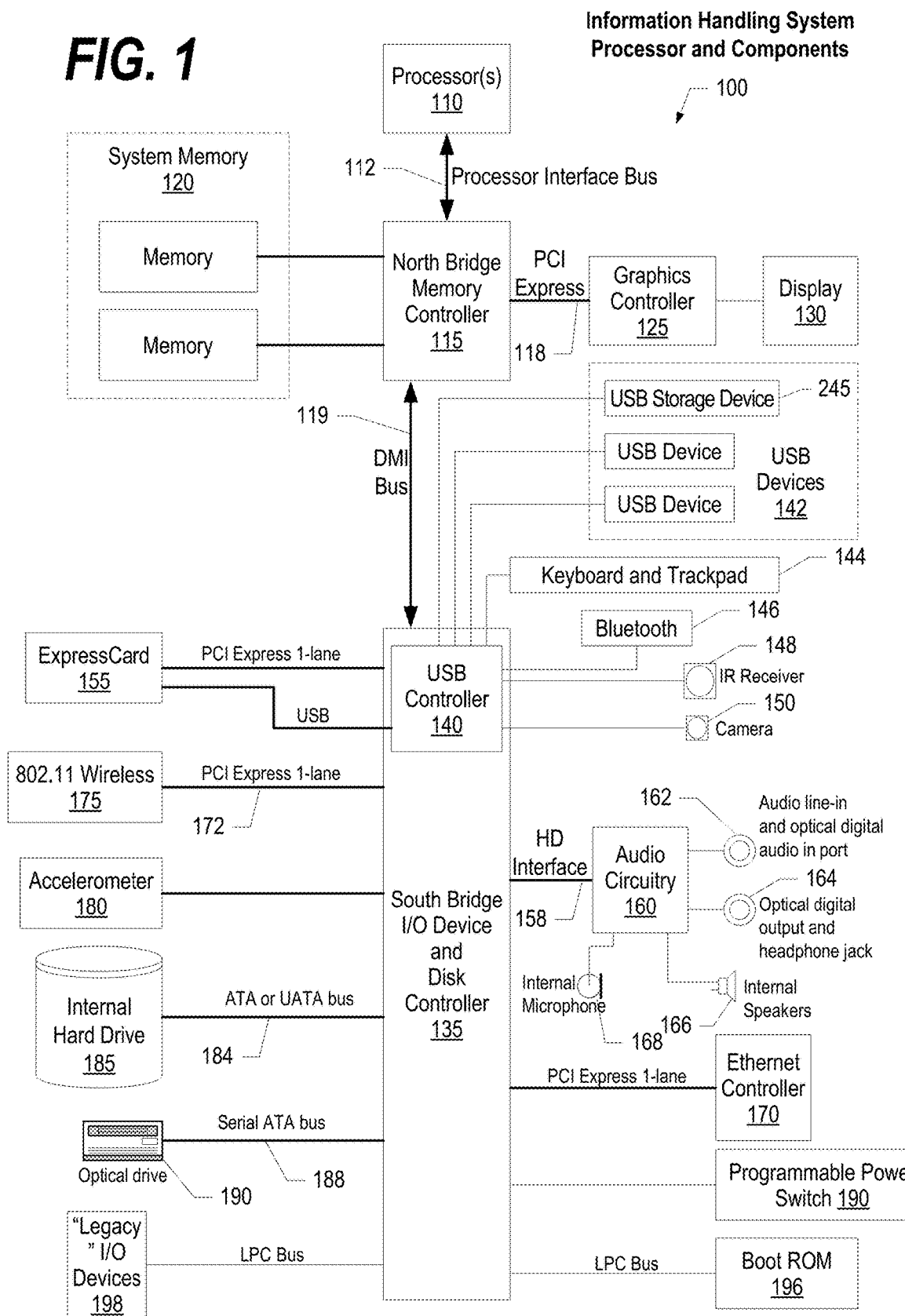
FIG. 1 is a block diagram of a data processing system in which the methods described herein can be implemented.

The figures show an approach that uses multiple, randomly selected, functions for each password hash calculation and chains them together. Using this random selection makes it exceedingly difficult to use GPU and hardware acceleration systems for brute forcing password hacking as these have a high cost of switching from hashing algorithm to hashing algorithm.

The method may uses a range of strong hashing and key derivation functions, such as SHA-256, SHA-384, SHA-512, SHA-3-256, SHA-3-384, SHA3-512, BLAKE2, BLAKE2b, BLAKE2s, Grøstl, Whirlpool, Skein, JH, BMW, Lyra2rev2, Shabal, Loselose, Djb2, scrypt, argon2d and so on.

In one embodiment, the function that hashes the password using a chain of random hashing functions uses the following parameters:
1. Minimum number (mn) of functions (for example, use of 16 or more functions, etc.);
2. Total number of distinct hashing functions (for example, use of 32 or more, etc.);
3. Total work factor (number of iterations or memory space)—depends from the method variant;
4. Password (pwd)—the secret that needs protection; and
5. An extra input called salt. The salt is not secret, but a new one is used for each password hashing instance. A salt prevents cost-sharing by attackers who generate or leverage precomputed tables (i.e. the so-called "rainbow tables").

The approach that hashes the password using a chain of random hashing functions includes the following steps:
1. Assign an alphanumeric character to the hashing algorithm: e.x: SHA-256—A, SHA-384—B, SHA-512—C, SHA-3-256—D, SHA-3-384—E, SHA-3-512—F, BLAKE2—G, BLAKE2s—H, etc.;
2. Randomly generate a set of characters out of those available in step 1 with a mn length defining set of hashing algorithms used. The same hashing algorithm can be used 2 or more times; and
3. Select a method of how hashing algorithms are combined together. There are numerous methods that define how hashing functions can be combined together. Example of the method is chained hashing methods.

In one embodiment, approach calculates a number of iterations based on the work factor for each function. The approach uses a Password-Based Key Derivation Function (e.g., PBKDF2, etc.) for each hashing function (HF) to generate an array of values such as the following: HF1 (pwd, salt, #it)→h1, HF2 (h1, salt, #it)→h2, HF16 (h15, salt, #iterations)→final value. The final value is used to verify that a user has entered the correct password.

The following detailed description will generally follow the summary, as set forth above, further explaining and expanding the definitions of the various aspects and embodiments as necessary. To this end, this detailed description first sets forth a computing environment in FIG. 1 that is suitable to implement the software and/or hardware techniques associated with the disclosure. A networked environment is illustrated in FIG. 2 as an extension of the basic computing environment, to emphasize that modern computing techniques can be performed across multiple discrete devices.

Figure 2:
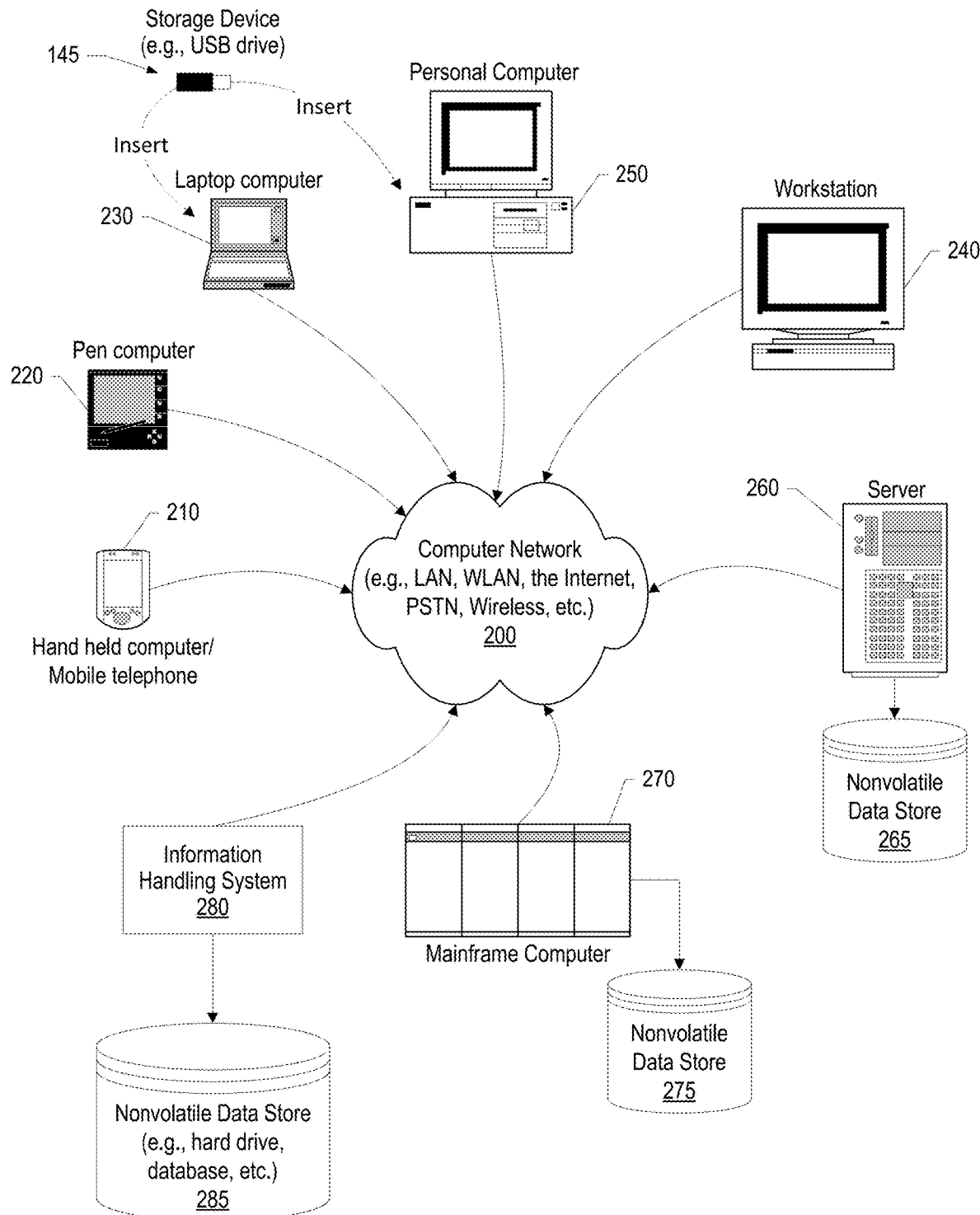
FIG. 2 provides an extension of the information handling system environment shown in FIG. 1 to illustrate that the methods described herein can be performed on a wide variety of information handling systems which operate in a networked environment.

FIG. 1 illustrates information handling system 100, which is a device that is a simplified example of a computer system capable of performing the computing operations described herein. Information handling system 100 includes one or more processors 110 coupled to processor interface bus 112. Processor interface bus 112 connects processors 110 to Northbridge 115, which is also known as the Memory Controller Hub (MCH). Northbridge 115 connects to system memory 120 and provides a means for processor(s) 110 to access the system memory. Graphics controller 125 also connects to Northbridge 115. In one embodiment, PCI Express bus 118 connects Northbridge 115 to graphics controller 125. Graphics controller 125 connects to display device 130, such as a computer monitor.

Northbridge 115 and Southbridge 135 connect to each other using bus 119.

In one embodiment, the bus is a Direct Media Interface (DMI) bus that transfers data at high speeds in each direction between Northbridge 115 and Southbridge 135. In another embodiment, a Peripheral Component Interconnect (PCI) bus connects the Northbridge and the Southbridge. Southbridge 135, also known as the I/O Controller Hub (ICH) is a chip that generally implements capabilities that operate at slower speeds than the capabilities provided by the Northbridge. Southbridge 135 typically provides various busses used to connect various components. These busses include, for example, PCI and PCI Express busses, an ISA bus, a System Management Bus (SMBus or SMB), and/or a Low Pin Count (LPC) bus. The LPC bus often connects low-bandwidth devices, such as boot ROM 196 and "legacy" I/O devices (using a "super I/O" chip). The "legacy" I/O devices (198) can include, for example, serial and parallel ports, keyboard, mouse, and/or a floppy disk controller. The LPC bus also connects Southbridge 135 to Trusted Platform Module (TPM) 195. Other components often included in Southbridge 135 include a Direct Memory Access (DMA) controller, a Programmable Interrupt Controller (PIC), and a storage device controller, which connects Southbridge 135 to nonvolatile storage device 185, such as a hard disk drive, using bus 184.

ExpressCard 155 is a slot that connects hot-pluggable devices to the information handling system. ExpressCard 155 supports both PCI Express and USB connectivity as it connects to Southbridge 135 using both the Universal Serial Bus (USB) the PCI Express bus. Southbridge 135 includes USB Controller 140 that provides USB connectivity to devices that connect to the USB. These devices include webcam (camera) 150, infrared (IR) receiver 148, keyboard and trackpad 144, and Bluetooth device 146, which provides for wireless personal area networks (PANs). USB Controller 140 also provides USB connectivity to other miscellaneous USB connected devices 142, such as a mouse, removable nonvolatile storage device 145, modems, network cards, ISDN connectors, fax, printers, USB hubs, and many other types of USB connected devices. While removable nonvolatile storage device 145 is shown as a USB-connected device, removable nonvolatile storage device 145 could be connected using a different interface, such as a Firewire interface, etcetera.

Wireless Local Area Network (LAN) device 175 connects to Southbridge 135 via the PCI or PCI Express bus 172. LAN device 175 typically implements one of the IEEE 802.11 standards of over-the-air modulation techniques that all use the same protocol to wireless communicate between information handling system 100 and another computer system or device. Accelerometer 180 connects to Southbridge 135 and measures the acceleration, or movement, of the device. Optical storage device 190 connects to Southbridge 135 using Serial ATA (SATA) bus 188. Serial ATA adapters and devices communicate over a high-speed serial link. The Serial ATA bus also connects Southbridge 135 to other forms of storage devices, such as hard disk drives. Audio circuitry 160, such as a sound card, connects to Southbridge 135 via bus 158. Audio circuitry 160 also provides functionality such as audio line-in and optical digital audio in port 162, optical digital output and headphone jack 164, internal speakers 166, and internal microphone 168. Ethernet controller 170 connects to Southbridge 135 using a bus, such as the PCI or PCI Express bus. Ethernet controller 170 connects information handling system 100 to a computer network, such as a Local Area Network (LAN), the Internet, and other public and private computer networks.

While FIG. 1 shows one information handling system, an information handling system may be a device that can take many forms. For example, an information handling system may take the form of a desktop device, server device, portable device, laptop device, notebook device, or other form factor device. In addition, an information handling system may take other form factors such as a personal digital assistant (PDA), a gaming device, ATM machine, a portable telephone device, a communication device or other devices that include a processor and memory.

The Trusted Platform Module (TPM 195) shown in FIG. 1 and described herein to provide security functions is but one example of a hardware security module (HSM). Therefore, the TPM described and claimed herein includes any type of HSM including, but not limited to, hardware security devices that conform to the Trusted Computing Groups (TCG) standard, and entitled "Trusted Platform Module (TPM) Specification Version 1.2." The TPM is a hardware security subsystem that may be incorporated into any number of information handling systems, such as those outlined in FIG. 2.

FIG. 2 provides an extension of the information handling system environment shown in FIG. 1 to illustrate that the methods described herein can be performed on a wide variety of devices that operate in a networked environment. Types of information handling systems range from small handheld devices, such as handheld computer/mobile telephone 210 to large mainframe systems, such as mainframe computer 270. Examples of handheld computer 210 include personal digital assistants (PDAs), personal entertainment devices, such as MP3 players, portable televisions, and compact disc players. Other examples of information handling system devices include pen, or tablet, device 220, laptop, or notebook, device 230, workstation device 240, personal computer system device 250, and server device 260. Other types of information handling system devices that are not individually shown in FIG. 2 are represented by information handling system device 280. As shown, the various information handling system devices can be networked together using computer network 200. Types of computer network that can be used to interconnect the various information handling systems include Local Area Networks (LANs), Wireless Local Area Networks (WLANs), the Internet, the Public Switched Telephone Network (PSTN), other wireless networks, and any other network topology that can be used to interconnect the information handling systems. Many of the information handling systems include nonvolatile data stores, such as hard drives and/or nonvolatile memory. Some of the information handling systems shown in FIG. 2 depicts separate nonvolatile data stores (server 260 utilizes nonvolatile data store 265, mainframe computer 270 utilizes nonvolatile data store 275, and information handling system 280 utilizes nonvolatile data store 285). The nonvolatile data store can be a component that is external to the various information handling systems or can be internal to one of the information handling systems. In addition, removable nonvolatile storage device 145 can be shared among two or more information handling systems using various techniques, such as connecting the removable nonvolatile storage device 145 to a USB port or other connector of the information handling systems.

Figure 3:
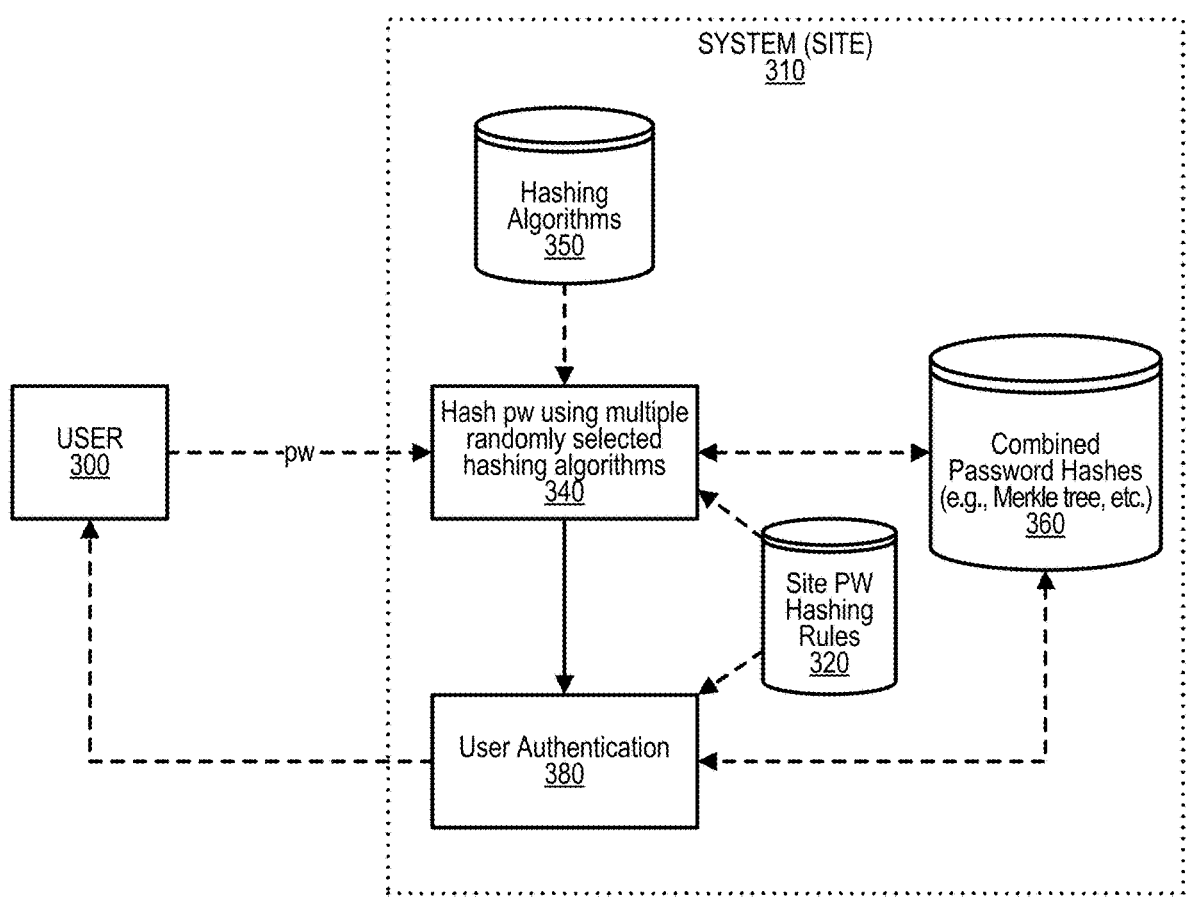
FIG. 3 is a component diagram depicting the components used in password protection using a chain of random hashing functions.

FIG. 3 is a component diagram depicting the components used in password protection using a chain of random hashing functions. User 300 submits a password to the system for verification, such as to be able to access a secured system. The user is associated with a unique user identifier, such as the user's email address or the like.

System 310, such as a secured web site (e.g., banking site, employer site, etc.) receives the password from the user. Hashing process 340 hashes the password using multiple randomly selected hashing algorithms. Hashing algorithms can include virtually any appropriate hashing algorithms which are stored in data store 350 for retrieval by process 340.

The secured site establishes a set of rules, such as the number of hashing algorithms that are used and how the hashes are combined to form a combined password hash. The combined password hashes are stored in data store 360 with the system discarding and not retaining the user's actual password. In one embodiment, the combined password hashes are stored in a Merkle tree.

Process 380 authenticates the user based on whether the password submitted by the user, when hashed using the multiple hashing algorithm, creates a final result that matches an expected result that is retrieved from data store 360. If the final hash result matches the expected hash result, then the user is authenticated and, in one embodiment, provided access to the secured system. On the other hand, if the final hash result does not match the expected hash result, then the system prevents the user from accessing the secured site.

Figure 4:
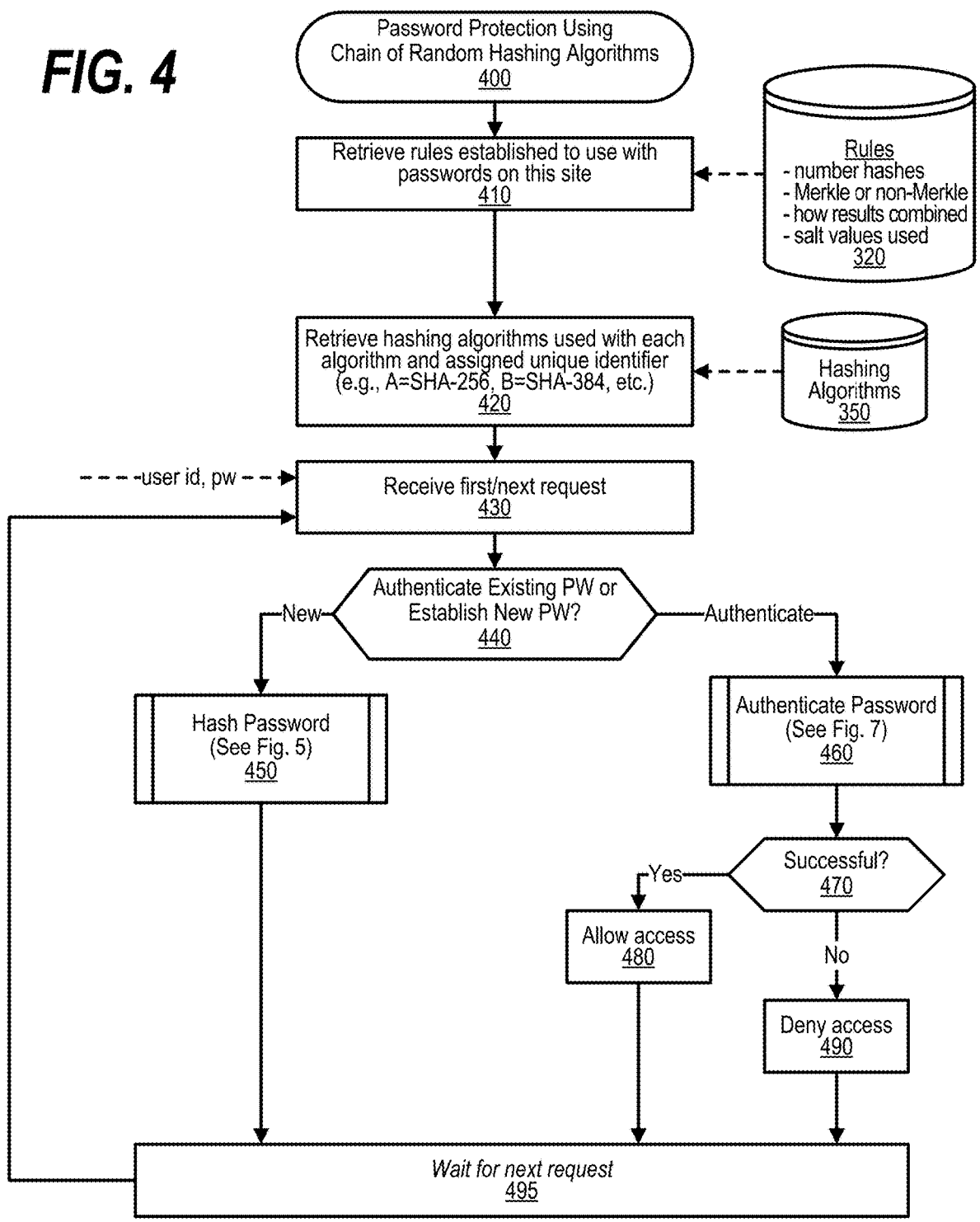
FIG. 4 is a flowchart showing steps taken by a process that provide password protection using a chain of random hashing functions.

FIG. 4 is a flowchart showing steps taken by a process that provide password protection using a chain of random hashing functions. FIG. 4 processing commences at 400 and shows the steps taken by a process that provides password protection by using a chain of multiple randomly selected hashing algorithms. At step 410, the process retrieves the rules established for passwords used on this site from data store 320. These rules might include the number of hash functions to use for each password, whether to store the resulting password hash results in a Merkle tree, how hash results are combined to form a final password hash result, and whether salt values are used with the hash functions.

At step 420, the process retrieves the hashing algorithms used with each hash function and assigns a unique identifier to each of the hashing algorithm. For example, hash algorithm SHA-256 might be assigned a first unique identifier (e.g., 'A'), hash algorithm SHA-384 might be assigned a second unique identifier (e.g., 'B'), and so on, until all of the hash algorithms are assigned a unique identifier. The hashing algorithms are retrieved from data store 350.

At step 430, the process receives the first request from a user with the request including the user's unique identifier to the site, such as the user's email address, and a password. The process determines whether the request is to authenticate an existing password for an existing user or if the request is to establish a new password for a new user that is setting up an account on the site (decision 440).

Figure 5:
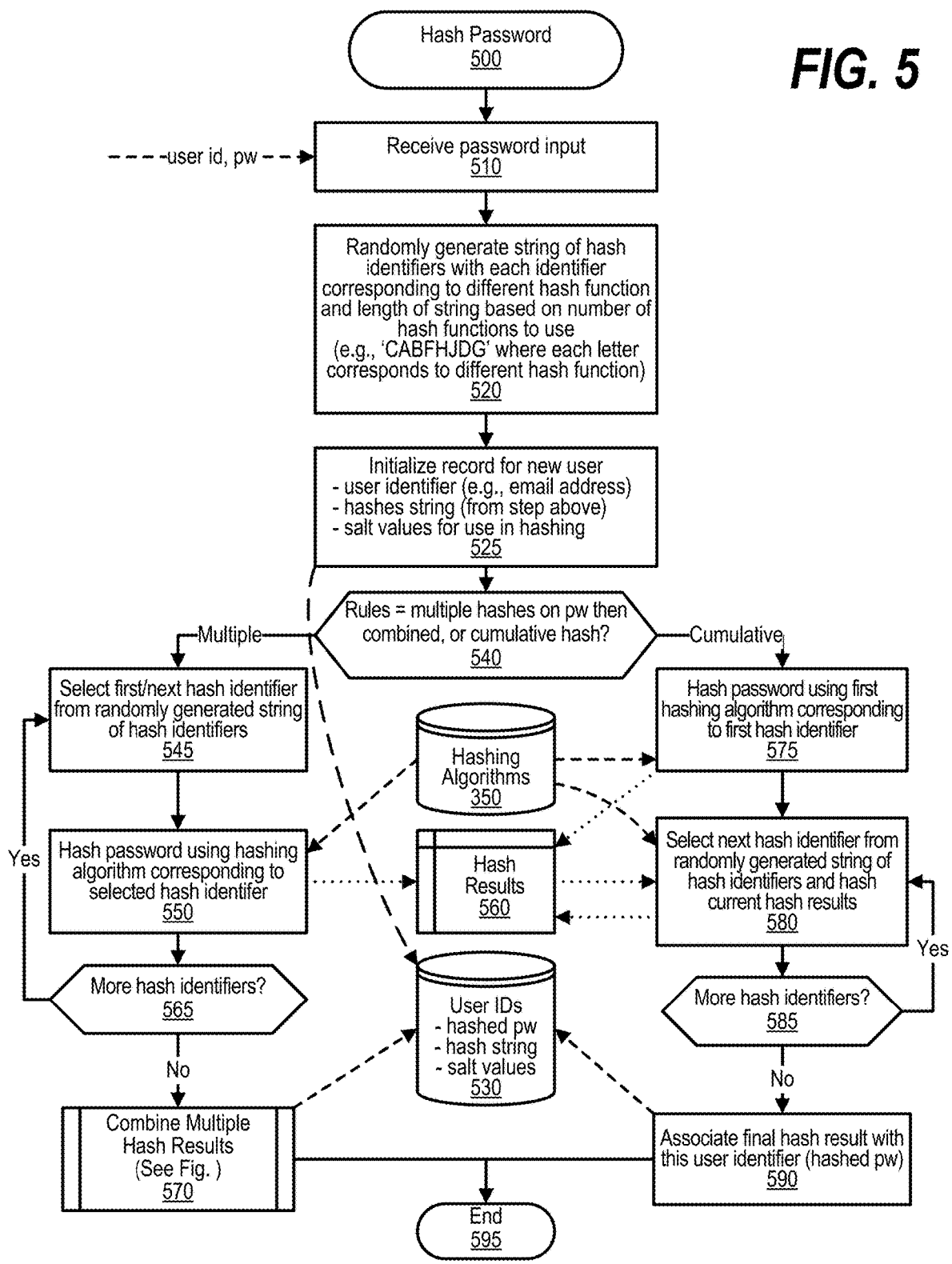
FIG. 5 is a flowchart showing steps taken by a process that implements a hash password routine.

If the request is to the request is to establish a new password for a new user that is setting up an account on the site, then decision 440 branches to the 'New' branch whereupon, at predefined process 450, the Hash Password routine is performed (see FIG. 5 and corresponding text for details). On the other hand, if the request is to authenticate an existing password for an existing user, then decision 440 branches to the 'Authenticate' branch whereupon steps 460 through 490 are performed.

When the Authenticate branch is taken, then steps 460 through 490 are performed. At predefined process 460, the Authenticate Password routine is performed (see FIG. 7 and corresponding text for details). The process determines as to whether the Authenticate Password routine successfully authenticated the password provided by the user (decision 470). If the password was successfully authenticated, then decision 470 branches to the 'yes' branch whereupon, at step 480, the user is allowed access to the secured resource (e.g., a secured website, etc.). On the other hand, if the password was not authenticated, then decision 470 branches to the 'no' branch whereupon, at step 490, the user is denied access to the secured resource.

At step 495, the process waits for next request to be received from a user. When the next request is received, then processing loops back to step 430 to process the incoming request as described above.

FIG. 5 is a flowchart showing steps taken by a process that implements a hash password routine. FIG. 5 processing commences at 500 and shows the steps taken by a process that hashes a password using multiple hashing algorithms. At step 510, the process receives the password input by the user that will be hashed using the multiple hashing algorithms. At step 520, the process randomly generates a string of hash identifiers with each identifier corresponding to a different hashing algorithm (function) the length of the generated string being based on the number of hash functions that is being used by the site. For example, a randomly generated string of 'CABFHJDG' would indicate that eight hashing algorithms are being used, with each letter in the generated string corresponding to a different hashing algorithm. In the example shown, the first hashing algorithm that will be used will be the hashing algorithm assigned to the identifier 'C', followed by the hashing algorithm assigned to the identifier 'A' and so on until the final hashing algorithm that corresponds to the identifier 'G' is used to hash the password data.

At step 525, the process initializes a record for the new user. A unique user identifier, such as the user's email address, is associated with the user and the generated random hash string (from step 520 above) is associated with the user. In addition, any salt values used with the hashing functions are also retained and associated with the user. The user identifier, randomly generated string, and salt values are stored in data store 530.

The process determines as to whether the rules established for the site use multiple hashes on the supplied password then the multiple hash values are combined, or use a cumulative hash where the password is hashed using the first hashing algorithm resulting in a hash result that is in turn hashed by a second hashing algorithm and so on with successive hash results being hashed by the next hashing algorithm (decision 540). If the rules use multiple hashes on the same password with the hash results being combined then decision 540 branches to the 'Multiple' branch whereupon steps 545 through 570 are executed. On the other hand, if the rules use the cumulative approach, then decision 540 branches to the 'Cumulative' branch whereupon steps 575 through 590 are executed.

When the 'Multiple' branch is taken, steps 545 through 570 are executed. At step 540, the process selects the first hash identifier from randomly generated string of hash identifiers. At step 550, the process hashes the password using the hashing algorithm corresponding to selected hash identifier (e.g., the algorithm corresponding to the identifier 'C', then 'A', then 'B', and so on using the example string shown in step 520, etc.). The hashing algorithm associated with the selected hash identifier is retrieved from data store 350 and the hash results are stored in memory area 560.

The process determines as to whether there are more hash identifiers in the generated string of hash identifiers yet to be processed (decision 565). If there are more hash identifiers in the generated string of hash identifiers to process, then decision 565 branches to the 'yes' branch which loops back to step 540 to select and process the next hashing algorithm with the password data as described above. This looping continues until each of the hash identifiers associated with this user identifier have been processed, at which point decision 565 branches to the 'no' branch exiting the loop. At predefined process 570, the process performs the Combine Multiple Hash Results routine (see FIG. 6 and corresponding text for processing details). The combined hash value is then associated with this user identifier and stored in data store 530.

When the 'Cumulative' branch is taken, steps 575 through 590 are executed. At step 575, the process hashes the supplied password using the first hashing algorithm that corresponds to the first hash identifier from the string of hash identifiers that are associated with this user identifier. The hash result is then stored in data store 560. At step 580, the process selects the next hash identifier from the randomly generated string of hash identifiers that is associated with this user identifier and then hashes the current hash results retrieved from memory area 560 with this hashing algorithm with the new hash result replacing the old hash result and stored in memory area 560.

The process determines whether there are more hash identifiers in the string of hash identifiers associated with this user identifier that are yet to be processed (decision 585). If there are more hash identifiers in the string of hash identifiers associated with this user identifier that are yet to be processed, then decision 585 branches to the 'yes' branch which loops back to step 580 to select and process the next hashing algorithm associated with the next hashing identifier included in the string of identifiers that is associated with this user identifier. This looping continues until all of the hashing identifiers in the string have been processed, at which point decision 585 branches to the 'no' branch exiting the loop. At step 590, the process associates the final hash result with this user identifier (a hashed password) with the final hash result being stored in data store 530. FIG. 5 processing thereafter ends at 595.

Figure 6:
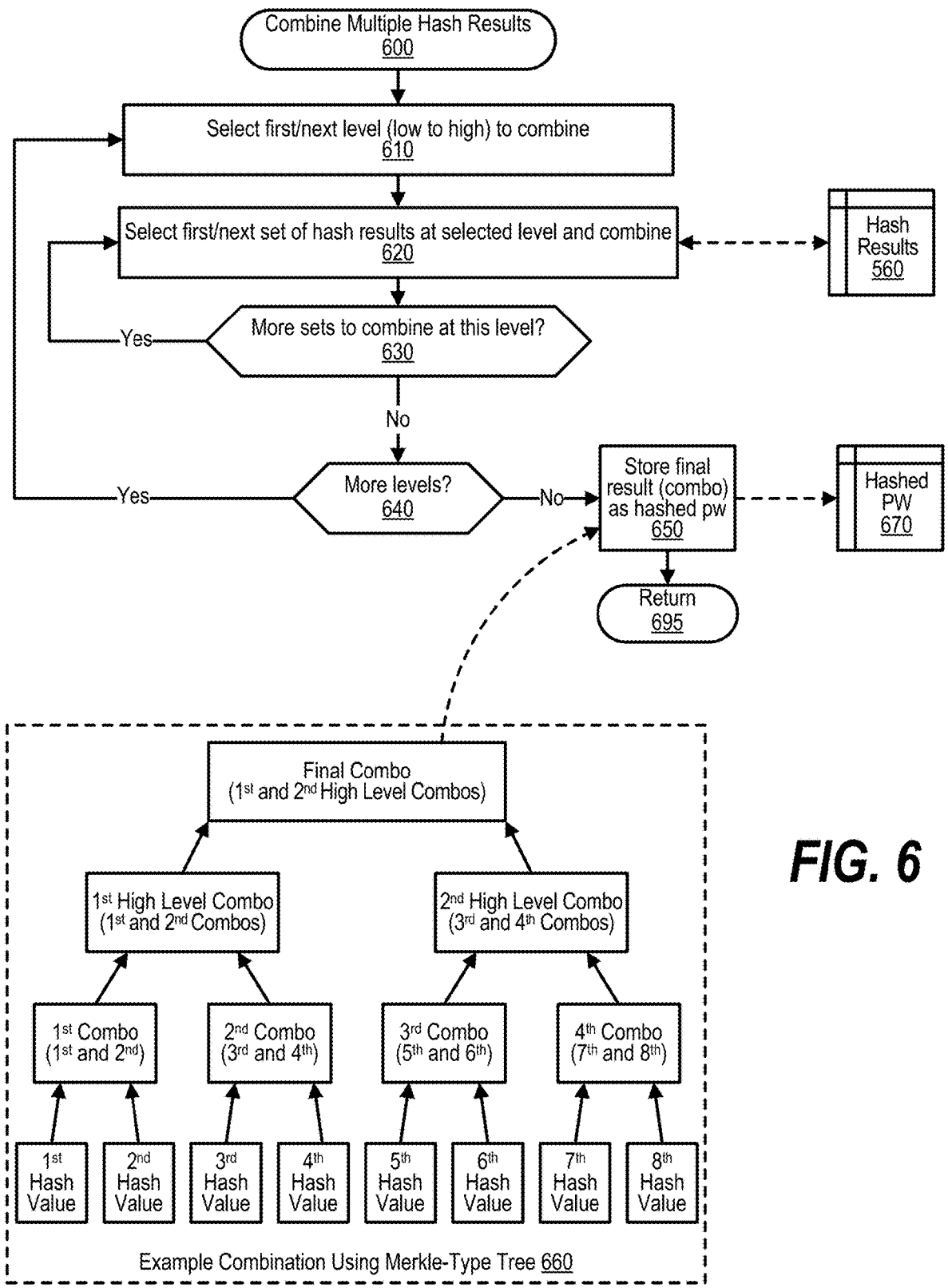
FIG. 6 is a flowchart showing steps taken by a process that combines multiple hash results.

FIG. 6 is a flowchart showing steps taken by a process that combines multiple hash results. FIG. 6 processing commences at 600 and shows the steps taken by a process that combines multiple hash results. At step 610, the process selects the first level of hash results (e.g., low level to higher levels) to combine. An example Merkle-type tree is shown in box 660. Here, the lowest level would be the bottom row of hash values. Using the example of a hash string from FIG. 5 (box 520) where the random hash algorithm identifiers were 'CABFHJDG', the first hash value would be the result of hashing the password using the hashing algorithm associated with the identifier 'C', the second hash value would be the result of hashing the password using the hashing algorithm associated with the identifier 'A', and so on with the eighth hash value being the result of hashing the password using the hashing algorithm associated with the identifier 'G'.

At step 620, the process selects the first set of hash results at the selected level and combines pairs using an algorithm (e.g., a hashing algorithm, etc.). For example, the first and second values (e.g., results from using 'C' and 'A' algorithms) are combined to form the first combo and so on until the last two (e.g., seventh and eighth when using eight hashing algorithms per password, etc.) are combined to form the fourth combo. The various hash results are retrieved from and stored in memory area 560. The process determines as to whether more sets to combine at the current level (decision 630). If there are more sets of values to combine at the current level, then decision 630 branches to the 'yes' branch which loops back to step 620 to repeat the combination of values step. This looping continues until there are no more values to combine at the current level, at which point decision 630 branches to the 'no' branch exiting the loop.

The process next determines as to whether there are more levels to process to arrive at a single hash result (decision 640). If there are more levels to process, then decision 640 branches to the 'yes' branch which loops back to step 610 to select the next level in the Merkle-type tree. This looping continues until there are no more levels to process, at which point decision 640 branches to the 'no' branch exiting the loop. At step 650, the process stores the final result (last combination) as the hashed password associated with the user's identifier and this hashed password is stored in memory area 670. FIG. 6 processing thereafter returns to the calling routine (see FIG. 5) at 695.

Figure 7:
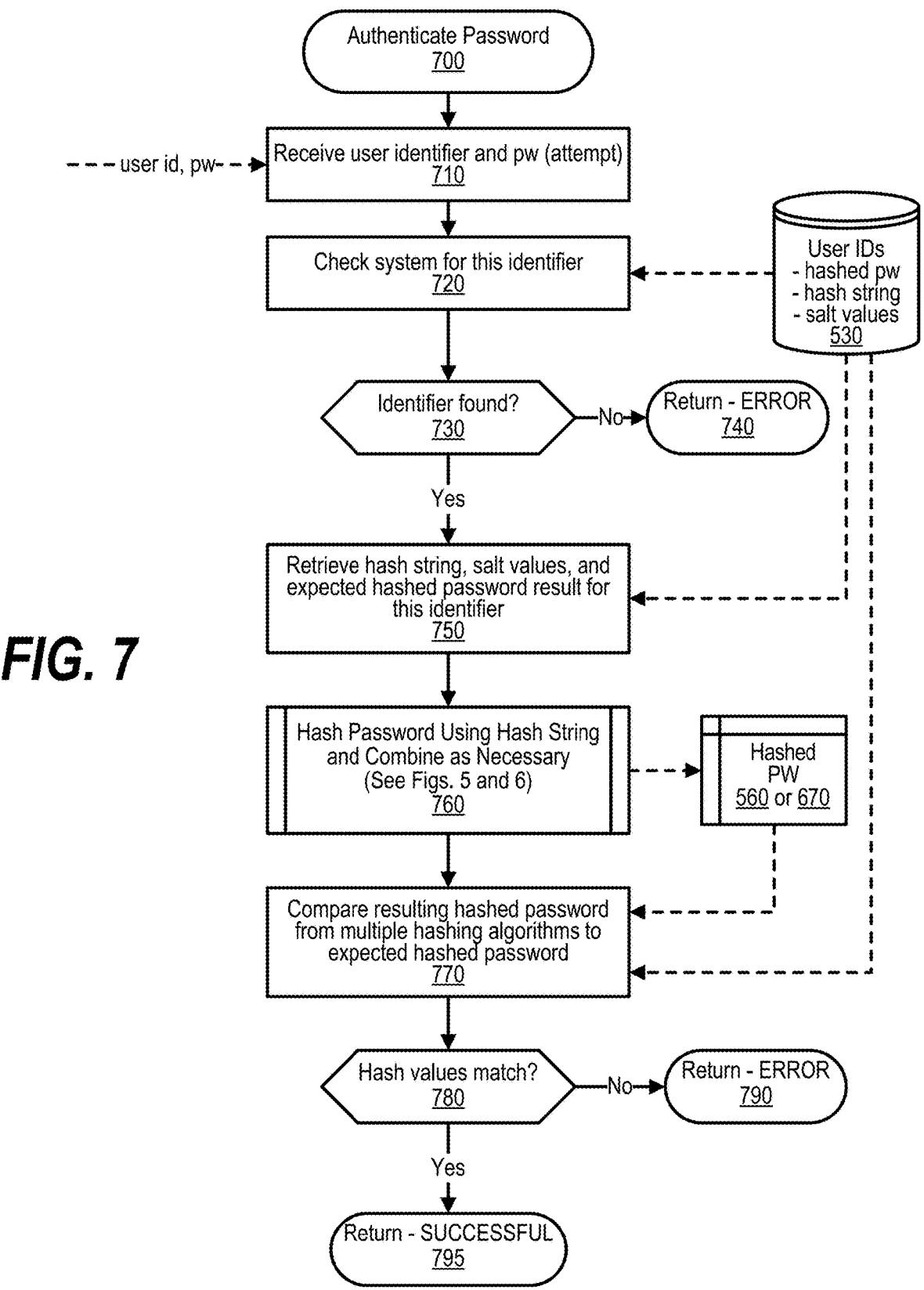
FIG. 7 is a flowchart showing steps taken by a process that implements an authenticate password routine.

FIG. 7 is a flowchart showing steps taken by a process that implements an authenticate password routine. FIG. 7 processing commences at 700 and shows the steps taken by a process that authenticates a password provided by a user when requesting access to a secured resource, such as a secured website. At step 710, the process receives the user's identifier (e.g., email address, etc.) and the password provided by the user. At step 720, the process checks data store 530 for this user identifier. The process determines as to whether the identifier was found in data store 530 (decision 730). If the identifier was found, then decision 730 branches to the 'yes' branch for further processing. On the other hand, if the identifier was not found, then decision 730 branches to the 'no' branch whereupon processing returns to the calling routine (see FIG. 4) with an error at 740.

If the user identifier was found in data store 530 then, at step 750, the process retrieves the hash string, salt values, and expected hashed password result for this identifier from data store 530. At predefined process 760, the process performs the Hash Password Using Hash String and Combine Results routines based on the rules being used in this implementation (see FIGS. 5 and 6 and corresponding text for processing details). The final result of the hashing of the password provided by the user is stored in memory area 560 or 670 (depending on whether the hash values are combined or cumulative). At step 770, the process compares the hashed password values resulting from processing the password using multiple hashing algorithms to the expected hashed password retrieved from data store 530.

The process determines as to whether the final hash value matches the expected hash value (decision 780). If the hash values match, then decision 780 branches to the 'yes' branch whereupon at 795 processing returns to the calling routine (see FIG. 4) with a 'successful' result and the user is allowed access to the secured resource. On the other hand, if the hash values do not match, then decision 780 branches to the 'no' branch whereupon, at 790, processing returns to the calling routine (see FIG. 4) with an 'error' result and the user is denied access to the secured resource.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The detailed description has been presented for purposes of illustration, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

As will be appreciated by one skilled in the art, aspects may be embodied as a system, method or computer program product. Accordingly, aspects may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable storage medium(s) may be utilized. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device. As used herein, a computer readable storage medium does not include a transitory signal.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described below with reference to flowchart illustrations and/or block diagrams of methods, apparatus (systems) and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

While particular embodiments have been shown and described, it will be obvious to those skilled in the art that, based upon the teachings herein, that changes and modifications may be made without departing from this disclosure and its broader aspects. Therefore, the appended claims are to encompass within their scope all such changes and modifications as are within the true spirit and scope of this disclosure. Furthermore, it is to be understood that the invention is solely defined by the appended claims. It will be understood by those with skill in the art that if a specific number of an introduced claim element is intended, such intent will be explicitly recited in the claim, and in the absence of such recitation no such limitation is present. For non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to others containing only one such element, even when the same claim includes the introductory phrases "one or more" or "at least one" and indefinite articles such as "a" or "an"; the same holds true for the use in the claims of definite articles.

What is claimed is:

1. A method, implemented by an information handling system comprising a processor, a memory accessible by the processor, and a network interface connecting the information handling system to a computer network, the method comprising:
    receiving a first password, wherein the first password corresponds to a first user identifier from a plurality of user identifiers that also includes a second user identifier;
    retrieving a first plurality of hashing algorithms based on the received first user identifier, wherein the second user identifier corresponds to a second plurality of hashing algorithms that are different than the first plurality of hashing algorithms;
    hashing the first password using each of the first plurality of hashing algorithms, the hashing resulting in a first hash result;
    retrieving a first expected hash result corresponding to the first user identifier; and
    verifying the received first password by comparing the first hash result to the first expected hash result.

2. The method of claim 1 wherein the hashing further comprises:
    first hashing the first password using a first hashing algorithm included in the first plurality of hashing algorithms, the first hashing resulting in a first hash result; and
    second hashing the first hash result using a second hashing algorithm included in the first plurality of hashing algorithms, the second hashing resulting in a second hash result.

3. The method of claim 1 wherein the first plurality of hashing algorithms has a first order in which the first plurality of hashing algorithms are executed.

4. The method of claim 3 wherein the first user identifier is included in a plurality of user identifiers that also includes a second user identifier, wherein the second user identifier corresponds to a second order in which a second plurality of hashing algorithms are executed when processing a second password that corresponds to the second user identifier, wherein the second order is different than the first order.

5. The method of claim 1 further comprising:
    receiving a new user identifier and a new password that corresponds to the new user identifier;
    pseudo-randomly selecting a first hashing algorithm from a plurality of available hashing algorithms;
    executing the selected first hashing algorithm against the new password resulting in a first hash result;
    generating an expected hash result that corresponds to the new password by repeatedly pseudo-randomly selecting one or more additional hashing algorithms, each of which is executed against a preceding hash result; and
    retaining the expected hash result in a nonvolatile data store.

6. The method of claim 5 further comprising:
    retaining the first hashing algorithm and the one or more additional hashing algorithms used to generate the expected hash result.

7. An information handling system comprising:
    one or more processors;
    a memory coupled to at least one of the processors;
    a network interface that connects the information handling system to a computer network; and
    a set of computer program instructions stored in the memory and executed by at least one of the processors in order to perform actions comprising:
        receiving a first password, wherein the first password corresponds to a first user identifier from a plurality of user identifiers that also includes a second user identifier;
        retrieving a first plurality of hashing algorithms based on the received first user identifier, wherein the second user identifier corresponds to a second plurality of hashing algorithms that are different than the first plurality of hashing algorithms;
        hashing the first password using each of the first plurality of hashing algorithms, the hashing resulting in a first hash result;
        retrieving a first expected hash result corresponding to the first user identifier; and
        verifying the received first password by comparing the first hash result to the first expected hash result.

8. The information handling system of claim 7 wherein the hashing further comprises:
    first hashing the first password using a first hashing algorithm included in the first plurality of hashing algorithms, the first hashing resulting in a first hash result; and
    second hashing the first hash result using a second hashing algorithm included in the first plurality of hashing algorithms, the second hashing resulting in a second hash result.

9. The information handling system of claim 7 wherein the first plurality of hashing algorithms has a first order in which the first plurality of hashing algorithms are executed.

10. The information handling system of claim 9 wherein the first user identifier is included in a plurality of user identifiers that also includes a second user identifier, wherein the second user identifier corresponds to a second order in which a second plurality of hashing algorithms are executed when processing a second password that corresponds to the second user identifier, wherein the second order is different than the first order.

11. The information handling system of claim 7 wherein the actions further comprise:
    receiving a new user identifier and a new password that corresponds to the new user identifier;
    pseudo-randomly selecting a first hashing algorithm from a plurality of available hashing algorithms;
    executing the selected first hashing algorithm against the new password resulting in a first hash result;
    generating an expected hash result that corresponds to the new password by repeatedly pseudo-randomly selecting one or more additional hashing algorithms, each of which is executed against a preceding hash result; and retaining the expected hash result in a nonvolatile data store.

12. The information handling system of claim 11 wherein the actions further comprise:

retaining the first hashing algorithm and the one or more additional hashing algorithms used to generate the expected hash result.

13. A computer program product comprising:

a computer readable storage medium, comprising computer program code that, when executed by an information handling system, executes actions comprising:

receiving a first password, wherein the first password corresponds to a first user identifier from a plurality of user identifiers that also includes a second user identifier;

retrieving a first plurality of hashing algorithms based on the received first user identifier, wherein the second user identifier corresponds to a second plurality of hashing algorithms that are different than the first plurality of hashing algorithms;

hashing the first password using each of the first plurality of hashing algorithms, the hashing resulting in a first hash result;

retrieving a first expected hash result corresponding to the first user identifier; and verifying the received first password by comparing the first hash result to the first expected hash result.

14. The computer program product of claim 13 wherein the hashing further comprises:

first hashing the first password using a first hashing algorithm included in the first plurality of hashing algorithms, the first hashing resulting in a first hash result; and second hashing the first hash result using a second hashing algorithm included in the first plurality of hashing algorithms, the second hashing resulting in a second hash result.

15. The computer program product of claim 13 wherein the first plurality of hashing algorithms has a first order in which the first plurality of hashing algorithms are executed.

16. The computer program product of claim 15 wherein the first user identifier is included in a plurality of user identifiers that also includes a second user identifier, wherein the second user identifier corresponds to a second order in which a second plurality of hashing algorithms are executed when processing a second password that corresponds to the second user identifier, wherein the second order is different than the first order.

17. The computer program product of claim 13 wherein the actions further comprise:

receiving a new user identifier and a new password that corresponds to the new user identifier;

pseudo-randomly selecting a first hashing algorithm from a plurality of available hashing algorithms;

executing the selected first hashing algorithm against the new password resulting in a first hash result;

generating an expected hash result that corresponds to the new password by repeatedly pseudo-randomly selecting one or more additional hashing algorithms, each of which is executed against a preceding hash result;

retaining the expected hash result in a nonvolatile data store; and retaining the first hashing algorithm and the one or more additional hashing algorithms used to generate the expected hash result.

* * * * *